United States Patent [19]
Takahashi

[11] Patent Number: 5,941,644
[45] Date of Patent: Aug. 24, 1999

[54] HYDRODYNAMIC BEARING

[75] Inventor: Takeshi Takahashi, Kashiba, Japan

[73] Assignee: Koyo Seiko Co., Ltd., Osaka, Japan

[21] Appl. No.: 09/145,460

[22] Filed: Sep. 2, 1998

[30] Foreign Application Priority Data

Sep. 5, 1997 [JP] Japan .................................. 9-257584

[51] Int. Cl.[6] .................................................. F16C 17/10
[52] U.S. Cl. ........................... 384/112; 384/113; 384/124
[58] Field of Search ...................................... 384/112, 113, 384/124, 115, 119

[56] References Cited

U.S. PATENT DOCUMENTS

| | | |
|---|---|---|
| 4,795,275 | 1/1989 | Titcomb et al. . |
| 5,277,499 | 1/1994 | Kameyama .............................. 384/112 |
| 5,685,647 | 11/1997 | Leuthold et al. ........................ 384/113 |

Primary Examiner—Lenard A. Footland
Attorney, Agent, or Firm—Thelen Reid & Priest, LLP

[57] ABSTRACT

It is an object of the invention to provide a hydrodynamic bearing which can be easily worked and assembled and in which a liquid is prevented from leaking.

In order to attain the object, in a hydrodynamic bearing including: a shaft having two radial flanges which are axially separated from each other by a predetermined distance; a sleeve through which the shaft is passed and which is pressingly held between the radial flanges; a radial dynamic pressure bearing portion which is formed between the shaft and the inner peripheral face of the sleeve; and pressure equalization passages which are respectively formed in the sleeve and at plural positions on a circumference, and through which the end faces of the sleeve communicate with each other, the shaft relatively rotating with respect to the sleeve, the sleeve is formed by an integral member, the pressure equalization passages are formed by plural holes through which the end faces of the sleeve communicate with each other, and liquid closing members which opposingly surround side faces of the radial flanges are fixed to the end faces of the sleeve with forming a predetermined gap, respectively.

3 Claims, 2 Drawing Sheets

HYDRODYNAMIC BEARING

BACKGROUND OF THE INVENTION

The invention relates to a hydrodynamic bearing.

FIG. 3 shows an example of a hydrodynamic bearing which is known in the art. The hydrodynamic bearing comprises: a shaft 30 having two radial flanges 34 and 35 which are axially separated from each other by a predetermined distance; a sleeve 31 through which the shaft 30 is passed and which is pressingly held between the radial flanges 34 and 35; a radial dynamic pressure bearing portion 37 which is formed between the shaft 30 and the inner peripheral face of the sleeve 31; axial dynamic pressure bearing portions 38 and 39 which are formed between the end faces of the sleeve 31 and the radial flanges 34 and 35, respectively; and pressure equalization passages 36 which are respectively formed in the sleeve 31 and at plural positions on a circumference and radially outside the axial dynamic pressure bearing portions 38 and 39, and through which the end faces of the sleeve communicate with each other. When the shaft 30 relatively rotates with respect to the sleeve 31, a dynamic pressure is generated in the radial dynamic pressure bearing portion 37 and the axial dynamic pressure bearing portions 38 and 39. The sleeve 31 is integrally formed by pressingly fitting a cylindrical inner sleeve 32 into a cylindrical outer sleeve 33. As shown in FIG. 4, cutaway portions 42 through which the end faces of the sleeve communicate with each other are formed in the outer peripheral face of the inner sleeve 32 and at diametrically opposite positions, respectively. When the inner sleeve 32 is pressingly fitted into the inner peripheral face of the outer sleeve 33, the cutaway portions 42 are formed as the pressure equalization passages 36. The inner peripheral faces 33a and 33b of the end portions of the outer sleeve 33 are disposed so as to be in close proximity to and opposed to the side faces 34a and 35a of the radial flanges, and also to surround the side faces 34a and 35a, respectively. Furthermore, liquid sealing portions 40 and 41 due to the surface tension are formed by gaps between the flange side faces 34a and 35a and the inner peripheral faces 33a and 33b of the outer sleeve, whereby the liquid in the bearing is sealed. Such a hydrodynamic bearing of the prior art is disclosed in, for example, the specification of the U.S. Pat. No. 4,795,275.

In the hydrodynamic bearing of the prior art, during a relative rotation of the shaft 30 and the sleeve 31, a dynamic pressure acts on the dynamic pressure bearing portions 37, 38, and 39. When the pressure balance in the bearing is lost, the liquid in the bearing may leak from the sealing gap 40 and 41 between the flange side faces 34a and 35a and the sleeve inner faces 33a and 33b. In order to maintain the pressure balance, the pressure equalization passages 36 are formed so that the liquid is supplied into the pressure equalization passages 36, thereby preventing the liquid from leaking.

In the hydrodynamic bearing of the prior art, the bearing consists of the three parts, i.e., the shaft 30, the inner sleeve 32, and the outer sleeve 33, and hence high coaxiality among the parts is required, so that it is difficult to work and assemble these parts. Because of this, these parts must be accurately worked, thereby increasing the production cost. Since the inner peripheral face of the outer sleeve 33 is formed by a cylindrical face, the leakage of the liquid inevitably occurs in spite of the existence of the pressure equalization passage 36.

SUMMARY OF THE INVENTION

It is an object of the invention to provide a hydrodynamic bearing which can be easily worked and assembled and in which a liquid is prevented from leaking.

As means for attaining the object, the hydrodynamic bearing is characterized in that it has configuration ① in which the hydrodynamic bearing comprises: a shaft having two radial flanges which are axially separated from each other by a predetermined distance; a sleeve through which the shaft is passed and which is pressingly held between the radial flanges; a radial dynamic pressure bearing portion which is formed between the shaft and the inner peripheral face of the sleeve; and pressure equalization passages which are respectively formed in the sleeve and at plural positions on a circumference, and through which the end faces of the sleeve communicate with each other, the shaft relatively rotating with respect to the sleeve, and the sleeve is formed by an integral member, the pressure equalization passages are formed by plural holes through which the end faces of the sleeve communicate with each other, liquid closing members which opposingly surround side faces of the radial flanges are fixed to the end faces of the sleeve, respectively, and liquid suppression portions are formed on inner faces of the liquid closing members, respectively, the pressure equalization passages being opened in the interior of the bearing via the liquid suppression portions, the liquid suppression portions guiding the liquid to the pressure equalization passages, thereby suppressing leakage of the liquid into the atmosphere side.

The hydrodynamic bearing is characterized in that it has configuration ① above, the liquid suppression portions are formed by conical faces which are formed on the inner faces of the liquid closing members and which have a diameter that is gradually reduced as moving toward the atmosphere side.

The hydrodynamic bearing is characterized in that it has configuration ③ in which, in configuration ① above, the liquid suppression portions are formed by peripheral steps which are formed on the inner faces of the liquid closing members and which have a rectangular section shape.

DETAILED DESCRIPTION OF THE PREFERRED EMBODIMENTS

Hereinafter, embodiments of the invention will be described with reference to the accompanying drawings.

Figure 1:
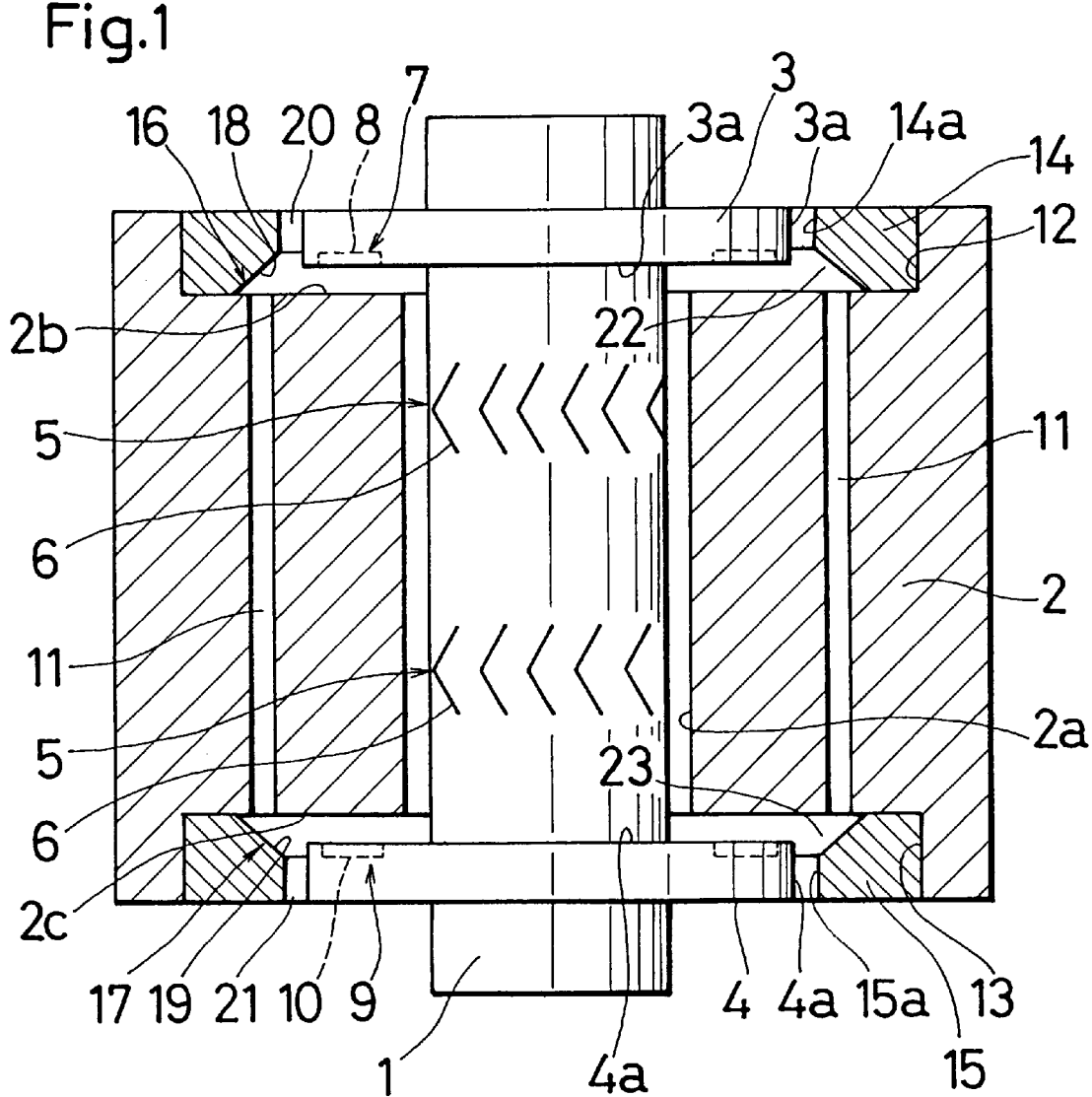
FIG. 1 is a section view of an embodiment of the invention.

FIG. 1 is a longitudinal section view of an embodiment of the hydrodynamic bearing of the invention. The hydrodynamic bearing comprises: a shaft 1 having two radial flanges 4 and 5 which are axially separated from each other by a predetermined distance; a sleeve 2 through which the shaft 1 is a passed and which is pressingly held between the radial flanges 3 and 4; a radial dynamic pressure bearing portion 5 which is formed between the shaft 1 and the inner peripheral face 2a of the sleeve 2, by forming dynamic pressure grooves 6 in the surface of the shaft 1; axial dynamic pressure bearing portions 7 and 9 which are respectively formed between the end faces 2b and 2c of the sleeve 2 and the radial flanges 3 and 4, by dynamic pressure grooves 8 and 10 formed in inner faces 3a and 4a of the radial flanges 3 and 4, the inner faces 3a and 4a being opposed to end faces 2b and 2c which extends in a direction perpendicular to the axial direction of the sleeve 2; and pressure equalization passages 11 which are respectively formed in the sleeve 2 and at plural positions on a circumference and radially outside the axial dynamic pressure bearing portions 7 and 9, and through which the end faces 2b and 2c of the sleeve 2 communicate with each other. The shaft 1 relatively rotates with respect to the sleeve 2.

The sleeve 2 is formed by an integral member. The pressure equalization passages 11 are formed by plural holes through which the end faces 2b and 2c of the sleeve 2 communicate with each other. Peripheral steps 12 and 13 are formed on the end faces 2b and 2c of the sleeve 2, respectively, so as to extend to the axial outside. Liquid closing members 14 and 15 are fixed to the peripheral steps 12 and 13 so as to opposingly surround the side faces 3a and 4a of the radial flanges 3 and 4 and form predetermined gaps 20 and 21, respectively. Furthermore, liquid suppression portions 16 and 17 are formed on inner faces of the liquid closing members 14 and 15, respectively. The liquid suppression portions are communicatingly opened in the interior of the bearing and guide the liquid to the pressure equalization passages 11, thereby suppressing leakage of the liquid into the atmosphere side.

The inner cylindrical faces 14a and 15a of the liquid closing members 14 and 15 are disposed so as to be in close proximity to and opposed to the side faces 3a and 4a of the radial flanges 3 and 4 of the shaft 1, respectively. Gaps 20 and 21 between these faces serve as liquid sealing portions due to the surface tension. Hereinafter, the gaps 20 and 21 are called the liquid sealing portions 20 and 21.

The liquid suppression portions 16 and 17 are formed as conical faces 18 and 19 which are formed on the inner faces of the liquid closing members 14 and 15 and which have a diameter that is gradually reduced as moving toward the atmosphere side. As described above, the conical faces 18 and 19 are formed at the positions where the pressure equalization passages 11 communicate with the interior of the bearing. The conical faces 18 and 19 which serve as the liquid suppression portions 16 and 17 enable the liquid to be surely moved through the pressure equalization passages 11 in order to maintain the pressure balance during the rotation of the bearing. Furthermore, the liquid is retained in liquid retention spaces 22 and 23 which are formed by the conical faces 18 and 19, and hence the liquid is prevented from leaking from the liquid sealing portions 20 and 21.

Figure 2:
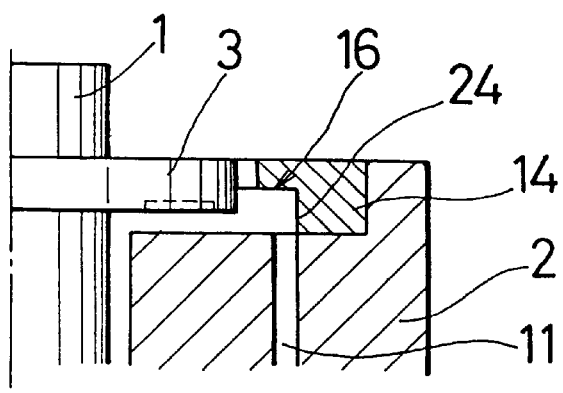
FIG. 2 is a partial section view of another embodiment of the invention.
Figure 3:
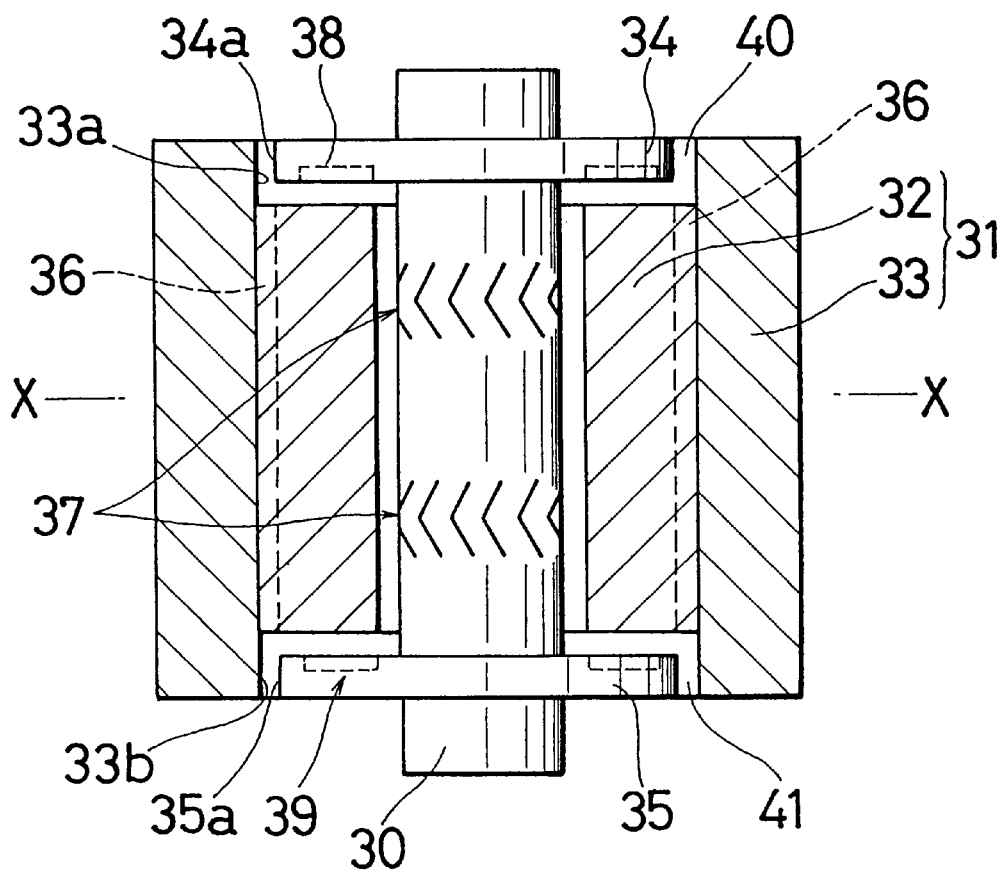
FIG. 3 is a section view of a hydrodynamic bearing of the prior art.
Figure 4:
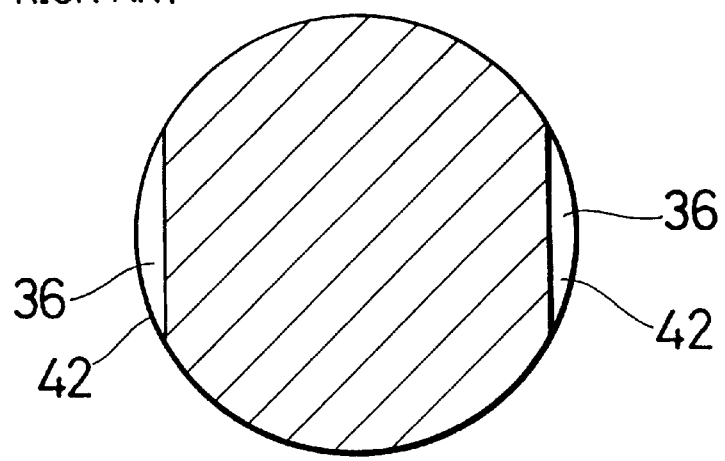
FIG. 4 is a section view taken along line X—X of FIG. 3.

As shown in FIG. 2, the liquid suppression portions 16 and 17 may be formed as peripheral steps 24 which are formed on the inner faces of the liquid closing members 14 and 15 and which have a rectangular section shape. As described above, the peripheral stops 24 are formed at the positions where the pressure equalization passages 11 communicate with the interior of the bearing. The peripheral steps 24 of a rectangular section shape which serve as the liquid suppression portions 16 and 17 can attain the same effect a the conical faces 18 and 19. The peripheral steps can be worked more easily than the conical faces.

In the hydrodynamic bearing of the invention, since the sleeve 2 is formed by the integral member, it is required only to consider coaxiality between the shaft 1 and the sleeve 2. Therefore, the hydrodynamic bearing can be worked and assembled more easily than a hydrodynamic bearing of the prior art. Because of the existence of the liquid suppression portions 16 and 17 formed in the liquid closing members 14 and 15, moreover, the liquid can be surely moved through the pressure equalization passages 11 in order to maintain the pressure balance during the rotation of the bearing.

What is claimed is:

1. A hydrodynamic bearing comprising: a shaft having two radial flanges which are axially separated from each other by a predetermined distance; a sleeve through which said shaft is passed and which is pressingly hold between said radial flanges; a radial dynamic pressure bearing portion which is formed between said shaft and an inner peripheral face of said sleeve; and pressure equalization passages which are respectively formed in said sleeve and at plural positions on a circumference, and through which end faces of said sleeve communicate with each other, said shaft relatively rotating with respect to said sleeve, wherein said sleeve is formed by an integral member, said pressure equalization passages are formed by plural holes through which said end faces of said sleeve communicate with each other, liquid closing members which opposingly surround side faces of said radial flanges are fixed to said end faces of said sleeve, respectively, and liquid suppression portions are formed on inner faces of said liquid closing members, respectively, said pressure equalization passages being opened in an interior of said bearing via said liquid suppression portions, said liquid suppression portions guiding the liquid to said pressure equalization passages, thereby suppressing leakage of the liquid into an atmosphere side.

2. A hydrodynamic bearing according to claim 1, wherein said liquid suppression portions are formed by conical faces which are formed on said inner faces of said liquid closing members and which have a diameter that is gradually reduced as moving toward the atmosphere side.

3. A hydrodynamic bearing according to claim 1, wherein said liquid suppression portions are formed by peripheral steps which are formed on said inner faces of said liquid closing members and which have a rectangular section shape.

* * * * *